United States Patent [19]

Röhrig

[11] Patent Number: 4,717,370

[45] Date of Patent: Jan. 5, 1988

[54] NOVEL PULLEY WITH DAMPENING ELEMENT

[75] Inventor: Harald Röhrig, Bonn, Fed. Rep. of Germany

[73] Assignee: INA Walzlager Schaeffler KG, Fed. Rep. of Germany

[21] Appl. No.: 913,694

[22] Filed: Sep. 30, 1986

[30] Foreign Application Priority Data

Oct. 8, 1985 [DE] Fed. Rep. of Germany ....... 3535859

[51] Int. Cl.⁴ .............................................. F16H 55/06
[52] U.S. Cl. .................................................... 474/161
[58] Field of Search ............... 474/161, 152, 153, 165, 474/190–192

[56] References Cited

U.S. PATENT DOCUMENTS 3,200,665  8/1965  Wells ................................ 474/161 X
3,610,066 11/1969  Rychlik ............................ 474/161 X
3,666,322  5/1972  Pickron ........................... 474/161 X Primary Examiner—Stephen J. Novosad
Assistant Examiner—Thuy M. Bui
Attorney, Agent, or Firm—Bierman and Muserlian

[57] ABSTRACT

A pulley comprising an outer rim provided with an outer running surface for a pulley belt and a hub concentric with the rim and a dampening element connected to the rim and hub in a non-rotating manner, the rim and hub being rigidly supported to one another in a radial and axial direction and the rim capable of moving at an angle to the hub in the circumferential direction, the rim and hub being made of a hard polymeric material and the dampening element being made of a softer polymeric material, the outer rim (3,15,22) and the hub (4,14,21) are connected to form an integral element by leaf spring-type ribs (6,16,23) having their least bending resistance moment around axes running parallel to the longitudinal axis of the pulley (1,13,20).

10 Claims, 6 Drawing Figures

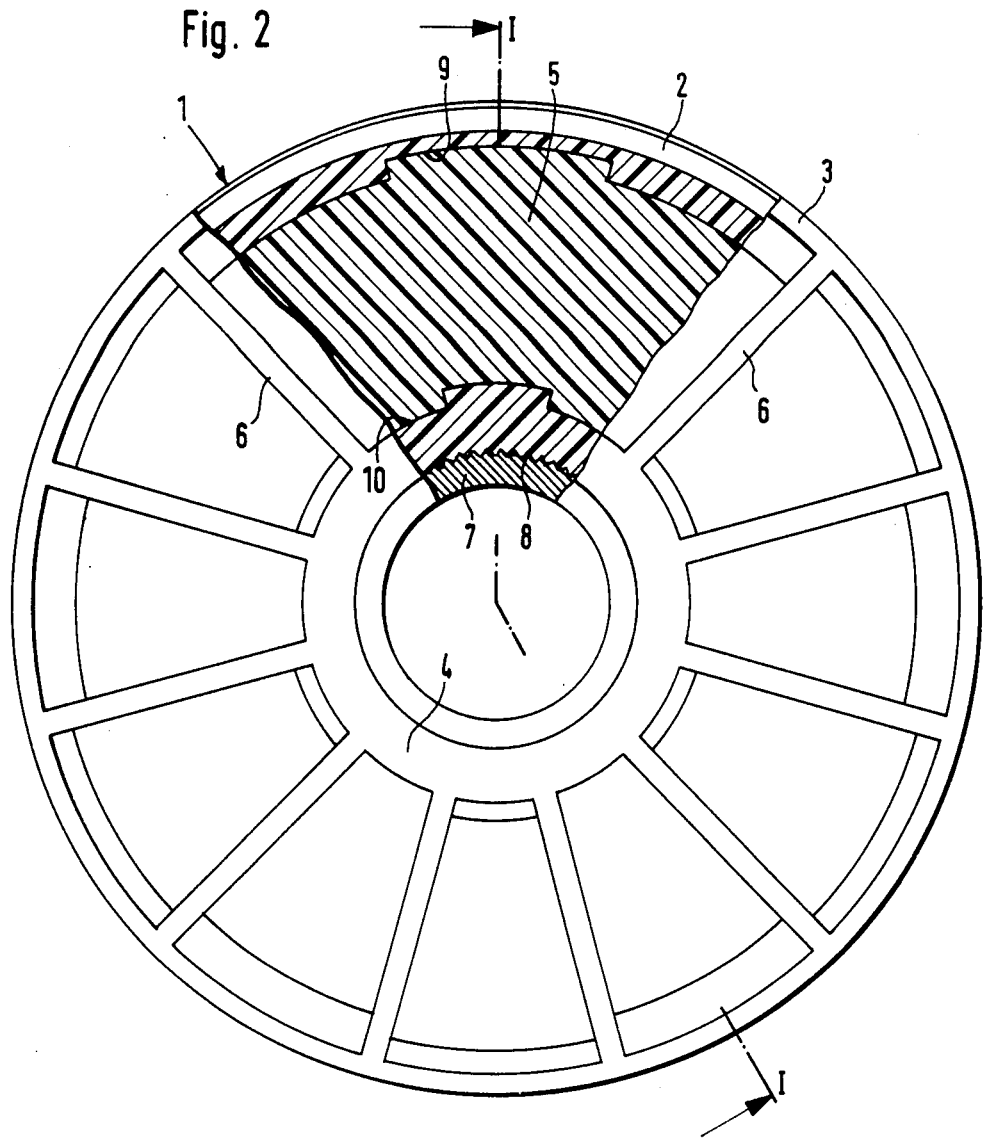

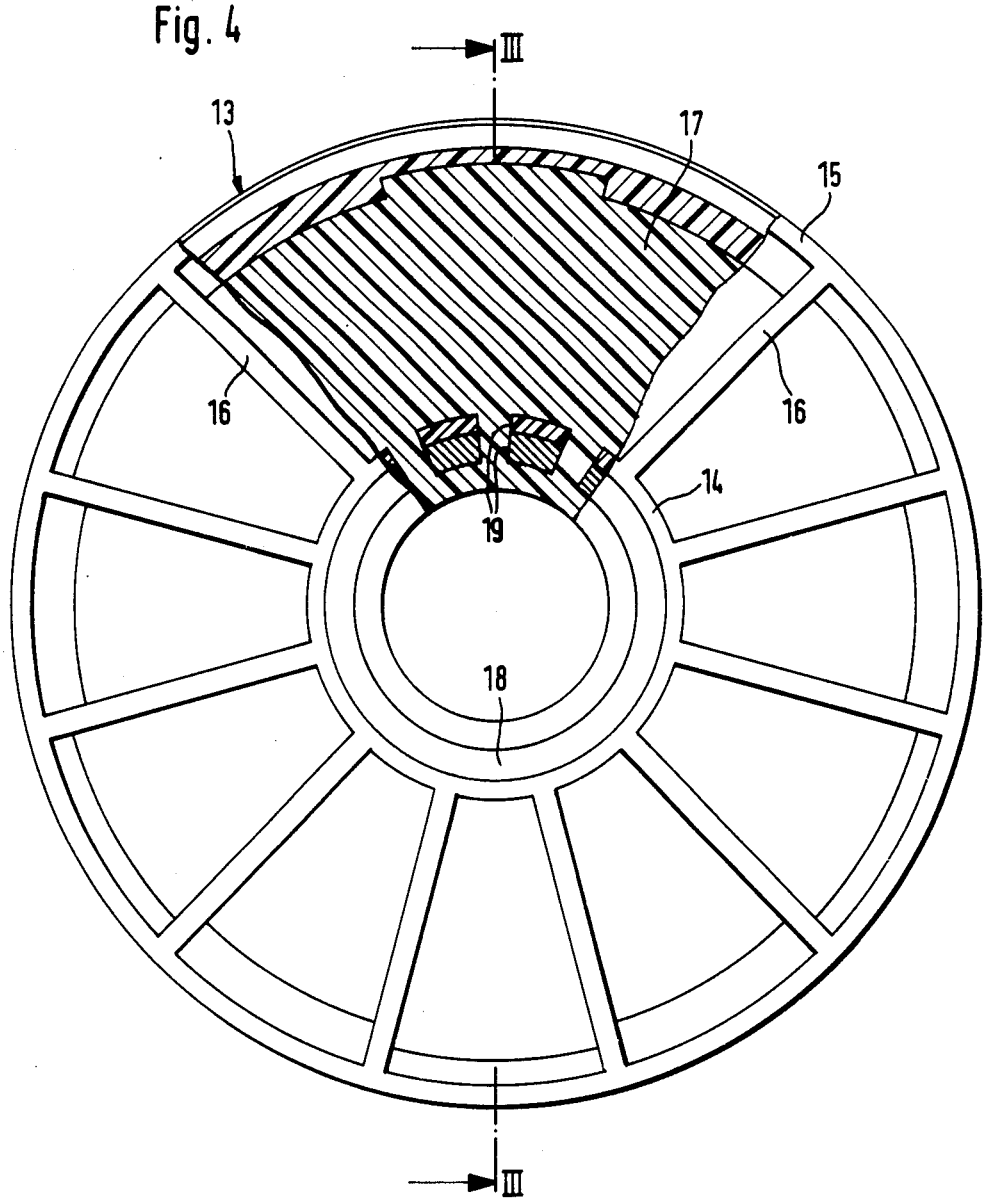

ём
4,717,370

NOVEL PULLEY WITH DAMPENING ELEMENT

STATE OF THE ART

Pulleys comprising an outer rim provided with an outer running surface of a pulley belt and a hub concentric with the rim and a dampening element connected to the rim and hub in a non-rotating manner, the rim and hub being rigidly supported to one another in a radical and axial direction and the rim capable of moving at an angle to the hub in the circumferential direction, the rim and hub being made of a hard polymeric material and the dampening element being made of a softer polymeric material are known and are used, for example, to drive secondary assemblies of combustion engines in motor vehicles, with the dampening element having the function of avoiding a transfer of rotary oscillation between the hub and the rim. For this purpose, it is necessary that the rim can be moved at an angle relative to the hub in the circumferential direction and the rigid fixation relative to the hub in the axial and radial direction ensures that the pulley can withstand stress in a radial and axial direction to the same degree as a conventional pulley without a dampening element and that no tumbling movements of the rim relative to the hub can occur.

DE-OS No. 34 02 001 describes a pulley wherein the rim is rigidly fixed relative to the hub in an axial and a radial direction by a disc-shaped web and to allow freedom of angular motion of the rim relative to the hub which is required to dampen the rotary oscillation, a roller bearing is placed between the web and the hub. The said pulley functions completely satisfactorily, but has the disadvantage that the actual pulley consists of at least two separate components between which a roller bearing is also located. Because of the two-part construction of the pulley and because of the roller bearing necessary for the pulley to function, the production costs for the pulley are significant.

OBJECTS OF THE INVENTION

It is an object of the invention to provide a novel economical pulley comprising as few elements as possible and not requiring a roller bearing between the rim and hub.

This and other objects and advantages of the invention will become obvious from the following detailed description.

THE INVENTION

The novel pulley of the invention comprising an outer rim provided with an outer running surface for a pulley belt and a hub concentric with the rim and a dampening element connected to the rim and hub in a non-rotating manner, the rim and hub being rigidly supported to one another in a radial and axial direction and the rim capable of moving at an angle to the hub in the circumferential direction, the rim and hub being made of a hard polymeric material and the dampening element being made of a softer polymeric material is characterized in that the outer rim (3,15,22) and the hub (4,14,21) are connected to form an integral element by leaf spring-type ribs (6,16,23) having their least bending resistance moment around axes running parallel to the longitudinal axis of the pulley (1,13,20). With this construction, the rim is rigidly secured relative to the hub in an axial and a radial direction since because of the leaf spring-type ribs which demonstrate their least bending resistance momentum around axes which run parallel to the longitudinal axis of the pulley, angular movements of the rim relative to the hub are possible in a circumferential direction allowing the dampening element to operate.

In a variation of the invention, the dampening element is essentially ring-shaped and the ribs are placed adjacent and on at least one side of the dampening element. With this construction, the pulley can be produced very simply since it is possible to place the softer dampening element in an injection mold and to surround it with the harder polymeric material to form the actual pulley. If a suitable material is selected, this results in a solid bond between the rim and the dampening element, i.e. between the hub and the dampening element. If the materials being used do not favor the formation of such a bond, the dampening element can be treated with an adhesive agent at the pertinent surfaces before the polymeric material is injected around it. If an injection mold with an expandable mold cavity is used, it is even possible to place the softer polymeric material into the mold first to form the dampening element, and then to expand the mold cavity immediately afterwards to form the actual pulley, and to place the harder polymeric material in so that the two polymeric materials bond at their contact surfaces while in the hot plastic state.

For applications in which very large forces must be transferred, one embodiment of the invention provides a metallic reinforcement sleeve in the bore of the hub, which is preferably firmly bonded to the pulley by having the material of the pulley injection molded about it. In this case, in another embodiment of the invention, it can be provided that the reinforcement sleeve extends along the entire length of the hub and it is then possible to create a connection between the pulley and a shaft which is resistant to rotation by placing the front surfaces of the reinforcement sleeve between two shaft segments or similar structures with a friction lock.

One variation of the invention provides that the hub and/or the reinforcement sleeve have at least one, possibly common aperture through which the softer polymeric material enters into the bore of the reinforcement sleeve whereby tolerances of the shaft diameter can be overcome as a result of the presence of the soft polymeric material in the bore of the reinforcement sleeve. In embodiments of the invention, the softer polymeric material can either cover the entire bore wall of the reinforcement sleeve or enter into the bore of the reinforcement sleeve through at least three apertures to form centering lugs.

In another embodiment of the invention, the separating surface between the rim and the dampening element and/or the separating surface between the dampening element and the hub are formed in a noncircular shape so that there is a positive lock to prevent rotation between the said elements, for cases in which a solid bond between the softer and the harder polymeric material cannot be brought about or is not sufficiently strong. Finally, in a last embodiment of the invention, the separating surface between the rim and the dampening element and/or the separating surface between the dampening element and the hub can be formed so that the elements are positively locked relative to one another in an axial direction.

Referring now to the drawings:

FIG. 2 is a pulley partially cut along the line II—II of FIG. 1.

FIG. 4 is a pulley partially cut along the line IV—IV of FIG. 3.

Figure 1:
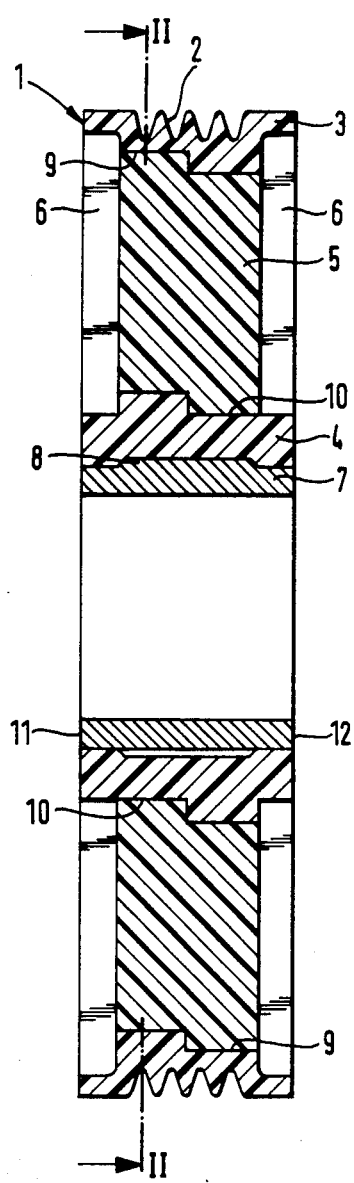
FIG. 1 is a cross-section taken along line I—I of FIG. 2.

FIGS. 1 and 2 show a pulley 1 of the invention consisting of a running surface 2 on a rim 3 which holds a multi-V-belt and of a hub 4 concentrically located in this rim and a dampening element 5 connected with the rim and the hub so that it cannot rotate.

Ribs 6 which run in the planes containing the longitudinal axis of the pulley 1 and which connect the rim 3 and the hub 4 into a uniform piece are provided on both sides of the dampening element 5. The ribs 6 result in rigid fixation of the rim 3 in an axial as well as a radial direction relative to the hub 4, while the rim 3 can make angular movements relative to the hub in the circumferential direction as a result of the leaf spring-type formation of the ribs 6 which have their least bending resistance momentum around axes which run parallel to the longitudinal axis of the pulley. This has the result that the dampening element 5 is deformed when rotary oscillations occur and dampens the rotary oscillations because it consists of a soft polymeric material. As a result of the leaf spring-type formation of the rib 6, the roller bearing which was required between the rib and the hub 4 by the known constructions can be eliminated, without the stability of the pulley or its ability to dampen rotary oscilliations being impaired.

The hub 4 has a reinforcement sleeve 7 in its bore which has an axial knurl 8 at its outer surfaces and since the reinforcement sleeve 7 is connected to the hub 4 by having the material of the hub injection molded around it, the axial knurl 8 provides a positive lock against rotation between the reinforcement sleeve 7 and the hub 4. Since the axial knurl 8 ends before the ends of the reinforcement sleeve 7 in each case, this also results in a positive lock hold of the reinforcement sleeve in the axial direction. In addition to the solid bond which exists between the rim 3 and the dampening element 5 on the one hand and between the dampening element 5 and the hub 4 on the other hand, both the rim 3 and the hub 4 have recesses 9 and 10 into which the dampening element locks with corresponding projections resulting in an additional positive lock against rotation between the dampening element 5 and the rim 3, i.e. the hub 4.

As can be seen from FIG. 1, the recesses 9 and 10 which alternately proceed from one and then the other frontal surface of the rim 3, i.e. the hub 4, do not extend over the entire length of the contact surfaces between the dampening element 5 and the rim, 3, i.e. the hub 4, so that there is also a positive lock between the said components in an axial direction. Since the reinforcement sleeve 7 extends over the entire length of the hub 4, it is not absolutely necessary to provide means for a positive lock to produce a connection resistant to rotation between the pulley 1 and a shaft which is not shown, for example, a fitting spring connection. Instead, a connection resistant to rotation is produced between the pulley 1 and the shaft by having the reinforcement sleeve 7 placed by its frontal surfaces 11 and 12 with a friction lock between two shaft segments, also not shown, or similar structures.

Figure 3:
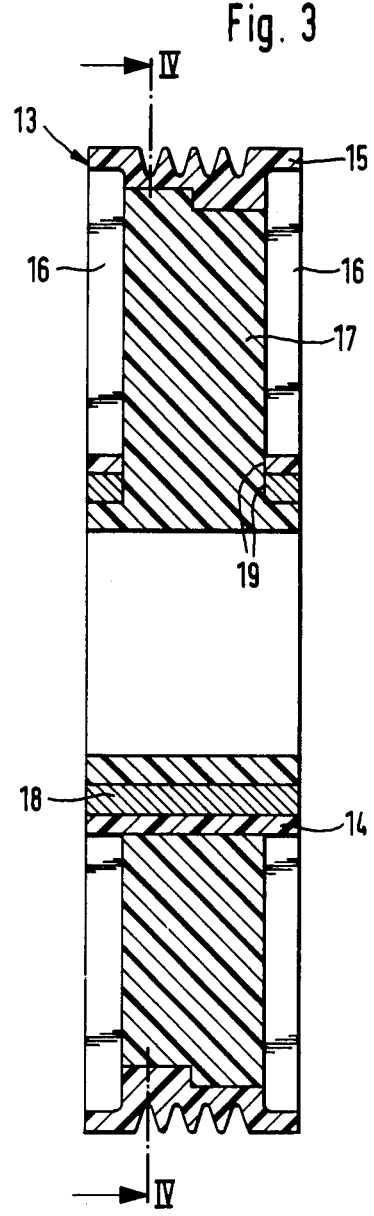
FIG. 3 is a cross-section taken through another pulley of the invention along the line III—III of FIG. 4

The pulley 13 of the invention as shown in FIGS. 3 and 4 has a hub 14 which is connected in one piece with a rim 15 in the manner described above by ribs 16, with a dampening element 17 being placed between the hub 14 and the rim 15. The hub 14 has a reinforcement sleeve 18. In contrast with the pulley described before, in the case of the pulley 13, the hub 14 and the reinforcement sleeve 18 are provided with common apertures 19 through which the soft polymeric material of the dampening element 17 enters into the bore of the reinforcement sleeve 18 and completely covers its bore wall. Because of the resilience of the soft polymeric material, tolerances of the shaft diameter can be overcome. Attachment of the pulley in such a way that it is resistant to rotation on a shaft which is not shown takes place in the manner described above.

Figure 5:
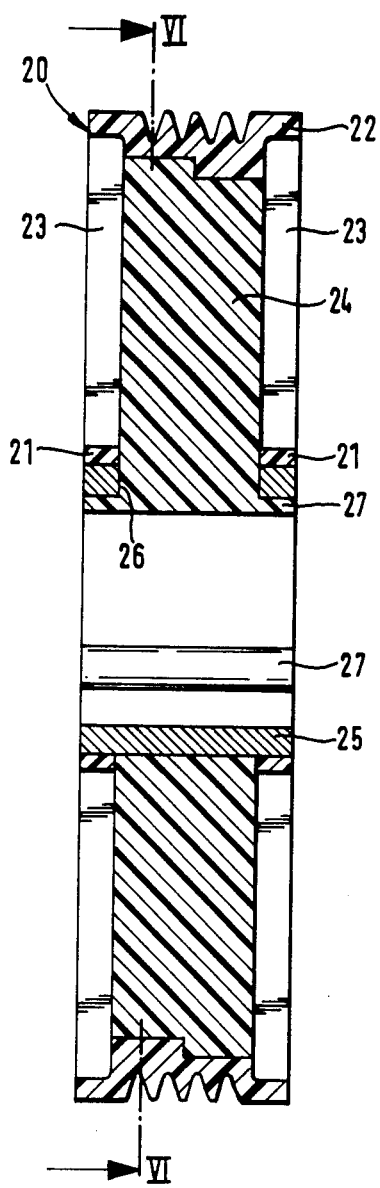
FIG. 5 is a cross-section taken through a pulley of the invention along the line V—V of FIG. 6
Figure 6:
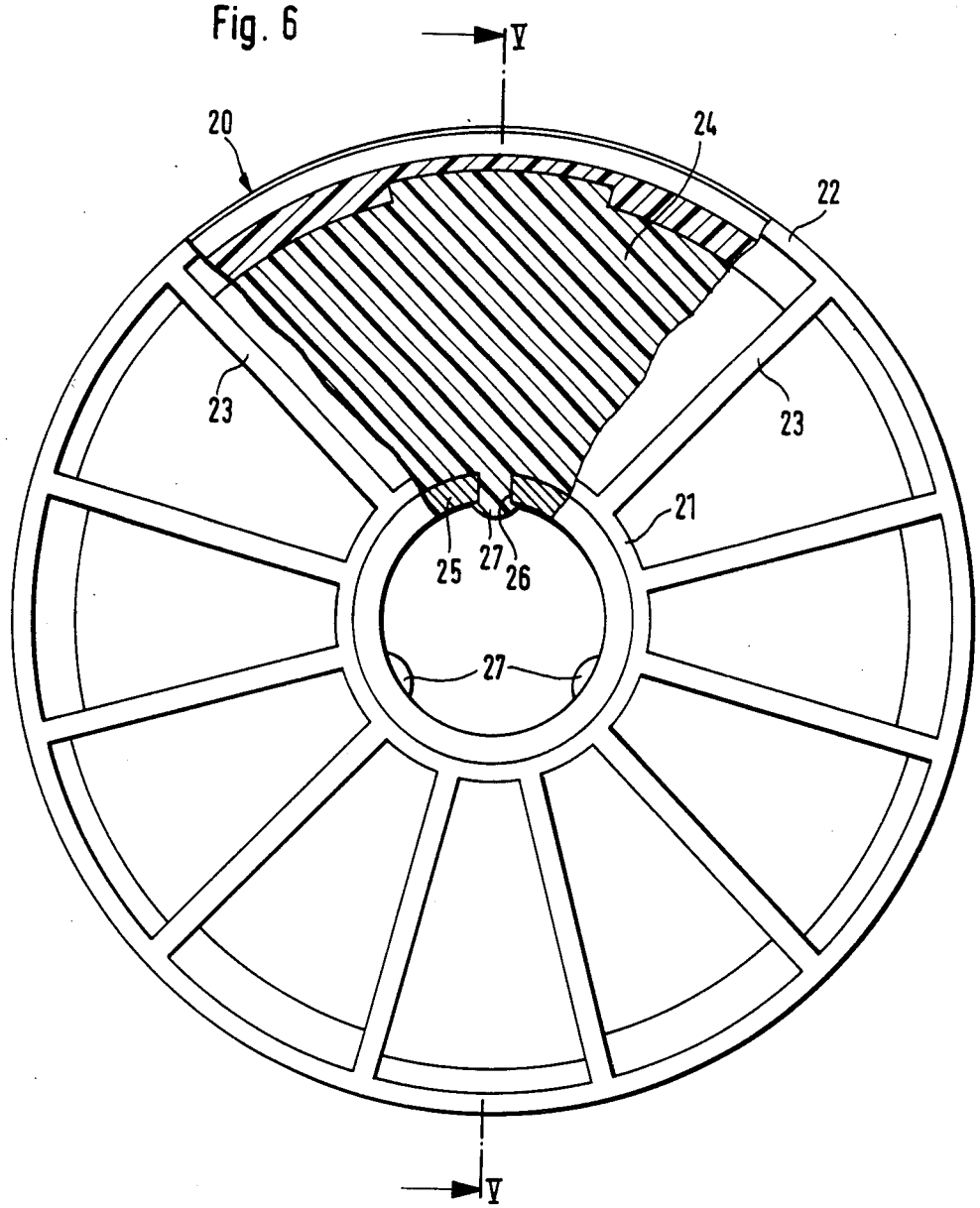
FIG. 6 is a pulley partially cut along the line VI—VI of FIG. 5.

The pulley 20 of the invention shown in FIGS. 5 and 6 also has a hub 21 and a rim 22 which are connected together to form a unitary element by ribs 23 with a dampening element 24 being located between the hub 21 and the rim 22. The hub 21 has a metallic reinforcement sleeve. In contrast to the embodiment described before, the hub 21 comprises two rings which end in the ribs 23 and whose width corresponds to the expanse of the ribs 23 in the direction of the longitudinal axis of the pulley 20. The reinforcement sleeve 25 has apertures 26 through which the soft polymeric material of the dampening element 24 enters into the bore of the reinforcement sleeve 25 where it does not cover the entire bore wall, but only forms centering lugs 26, which are pressed against a shaft which is not shown by the pulley 20. Because of the resilience of the centering lug 27, tolerances of the shaft diameter can be overcome.

Although the embodiment only shows pulleys for multi-V-belts, the pulleys of the invention can have running surfaces for any other type of belt. Also, the arrangement of the ribs next to the dampening element which is the only one shown in the embodiments must be understood as being only an example. The ribs can certainly extend partially or completely through the dampening element.

Various modifications of the pulleys of the invention may be made without departing from the spirit or scope thereof and it is to be understood that the invention is intended to be limited only as defined in the appended claims.

What I claim is:

1. A pulley comprising an outer rim provided with an outer running surface for a pulley belt and a hub concentric with the rim and a dampening element connected to the rim and hub in a non-rotating manner, the rim and hub being rigidly supported to one another in a radial and axial direction and the rim capable of moving at an angle to the hub in the circumferential direction, the rim and hub being made of a hard polymeric material and the dampening element being made of a softer polymeric material, the outer rim (3,15,22) and the hub (4,14,21) are connected to form an integral element by leaf spring-type ribs (6,16,23) having their least bending resistance moment around axes running parallel to the longitudinal axis of the pulley (1,13,20).

2. A pulley of claim 1 wherein the dampening element (5,17,24) is essentially ring-shaped, and the ribs (6,16,23) are next to and on at least one side of the dampening element (5,17,24).

3. A pulley of claim 1 wherein a metallic reinforcement sleeve (7,18,25) is provided in the bore of the hub (4,14,21).

4. The pulley of claim 3 wherein the sleeve (7,18,25) is positively locked with the pulley by injection molding the material of the pulley (1,13,20) around it.

5. A pulley of claim 3 wherein the reinforcement sleeve (7,18,25) extends along the entire length of the hub (4,13,21).

6. A pulley comprising an outer rim provided with an outer running surface for a pulley belt and a hub concentric with the rim and a dampening element connected to the rim and hub in a non-rotating manner, the rim and hub being rigidly supported to one another in a radial and axial direction and the rim capable of moving at an angle to the hub in the circumferential direction, the rim and hub being made of a hard polymeric material and the dampening element being made of a softer polymeric material, the outer rim (3,15,22) and the hub (4,14,21) are connected to form an integral element by leaf spring-type ribs (6,16,23) having their least bending resistance moment around axes running parallel to the longitudinal axis of the pulley (1,13,20) and the hub (14,21) an/or the r einforcement sleeve (18,25) have at least one aperture (19,26) through which the softer polymeric material enters into the bore of the reinforcement sleeve (18,25).

7. A pulley of claim 6 wherein the softer polymeric material covers the entire bore wall of the reinforcement sleeve (18).

8. A pulley of claim 6 wherein the softer polymeric material enters into the bore of the reinforcement sleeve (25) through at least three apertures (26) to form centering lugs (27).

9. A pulley of claim 1 wherein the separating surface betwee the rim (3,15,22) and the dampening element (5,17,24) and/or the separating surface between the dampening element (5,17,24) and the hub (4,14,2 is formed in a non-circular shape to form a positive lock to prevent rotation between the said elements.

10. A pulley of claim 1 wherein the separating surface between the rim (3,15,22) and the dampening element (5,17,24) and/or the separating surface between the dampening element (5,15,24) and the hub (4,14,21) is formed so that the said elements are positive axially locked relative to one another.

* * * * *